United States Patent [19]

Bivens

[11] Patent Number: 5,657,969

[45] Date of Patent: Aug. 19, 1997

[54] SNAP-IN PUSH-PUSH LATCH MECHANISM

[75] Inventor: Steven L. Bivens, Kankakee, Ill.

[73] Assignee: Illinois Tool Works Inc., Glenview, Ill.

[21] Appl. No.: 634,499

[22] Filed: Apr. 18, 1996

Related U.S. Application Data

[63] Continuation-in-part of Ser. No. 368,152, Dec. 12, 1994, Pat. No. 5,518,223.
[51] Int. Cl.$^6$ .................................................. F16F 1/06
[52] U.S. Cl. .......................... 267/64.12; 16/66; 16/84
[58] Field of Search ............................ 188/270, 281, 188/282, 300, 301, 322.18, 322.15, 322.22; 267/64.12, 64.14; 16/66, 84, DIG. 10, DIG. 17, DIG. 22

[56] References Cited

U.S. PATENT DOCUMENTS

| | | | |
|---|---|---|---|
| 2,497,425 | 2/1950 | Terry | 126/285 R |
| 4,629,167 | 12/1986 | Kimura et al. | 16/66 X |
| 4,948,103 | 8/1990 | Bowden et al. | 16/84 X |
| 5,165,124 | 11/1992 | Li | 5/100 |
| 5,220,706 | 6/1993 | Bivens | 16/66 |

*Primary Examiner*—Josie Ballato
*Attorney, Agent, or Firm*—Schwartz & Weinrieb

[57] ABSTRACT

A latch mechanism of the push-push type comprises a latching member and a latch track member which are adapted to be respectively snap-fittingly mounted upon a closure member and a closure housing such that the latch mechanism constitutes an independent or separate latching entity or unit which may be readily incorporated within or mounted upon any closure assembly such as, for example, a cup holder, an ashtray, or a glove compartment door assembly within an automotive vehicle. Structure is provided upon the latch mechanism for permitting the closure member to be opened, even if the closure member is inadvertently pulled instead of pushed, without damaging the latch mechanism, and additional structure is also provided upon the latch mechanism for retaining the closure member at its inward closed and latch position when excessive pushing forces are impressed thereon, such as, for example, attendant a vehicle accident, such that the closure member is not permitted to move to its unlatched and opened position and thereby present a hazard to the vehicle driver or passenger.

20 Claims, 4 Drawing Sheets

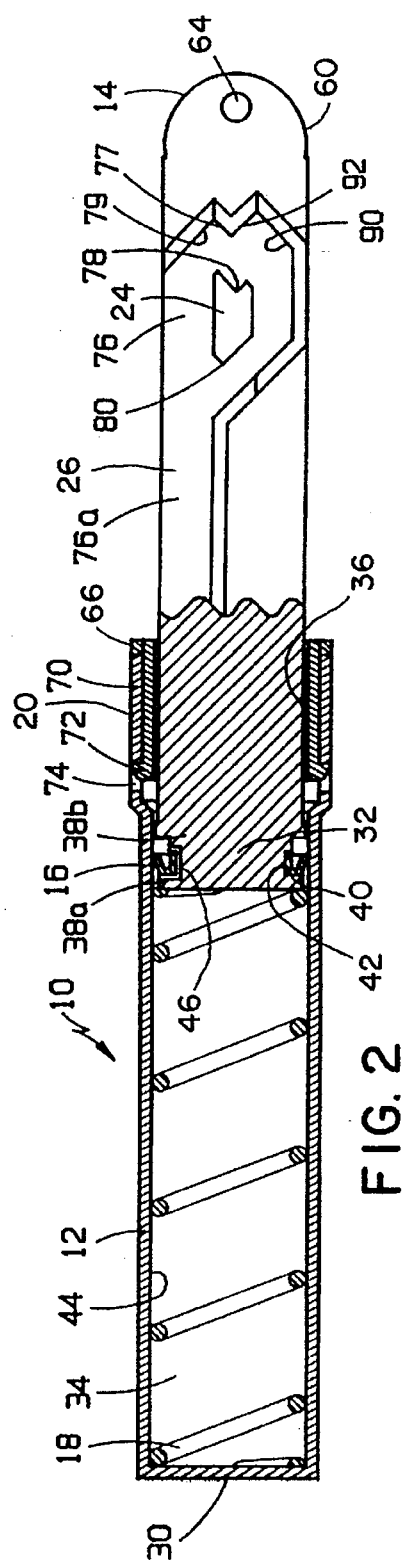
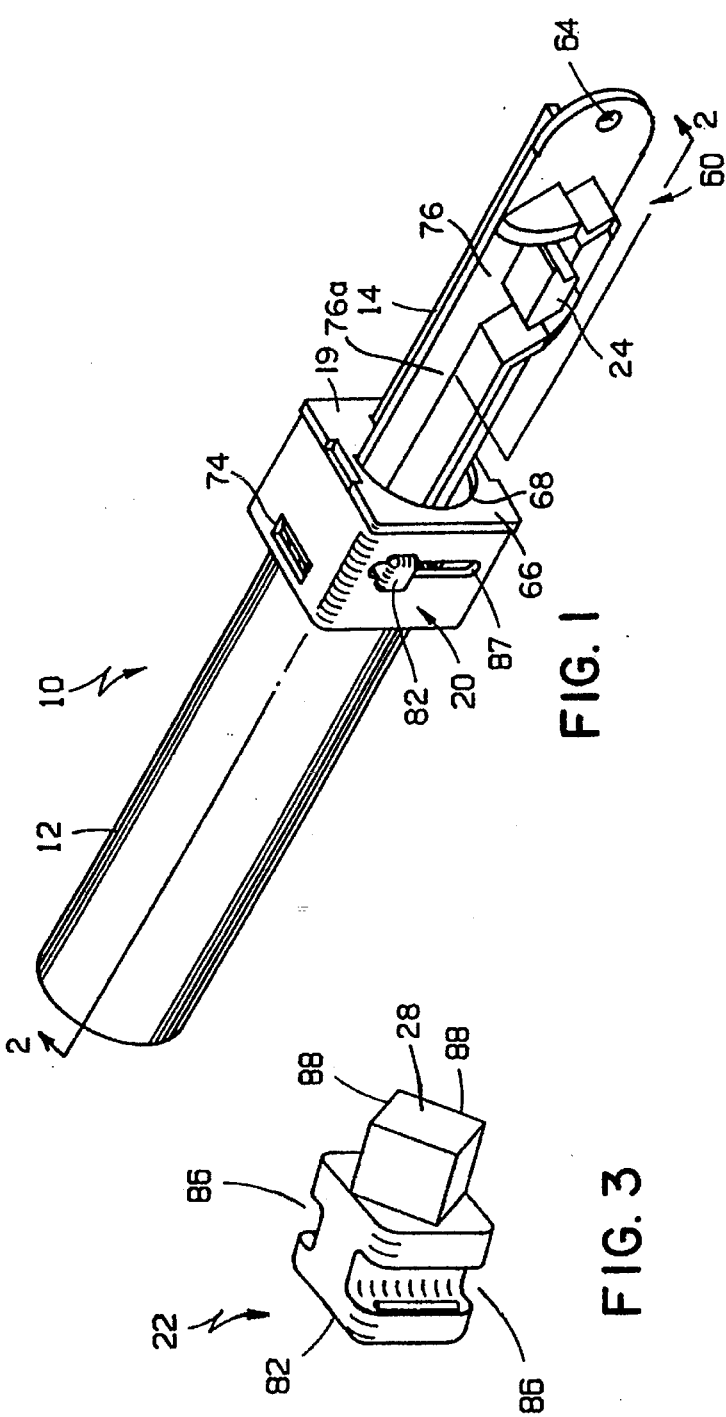
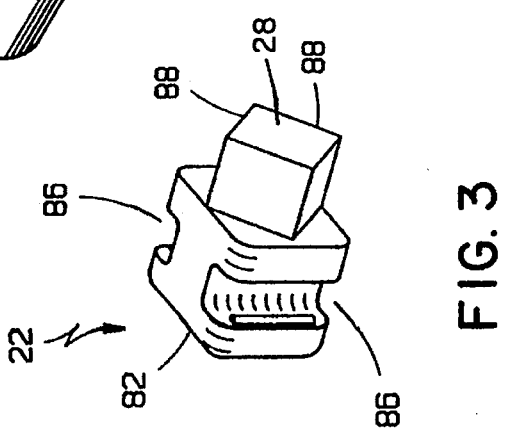

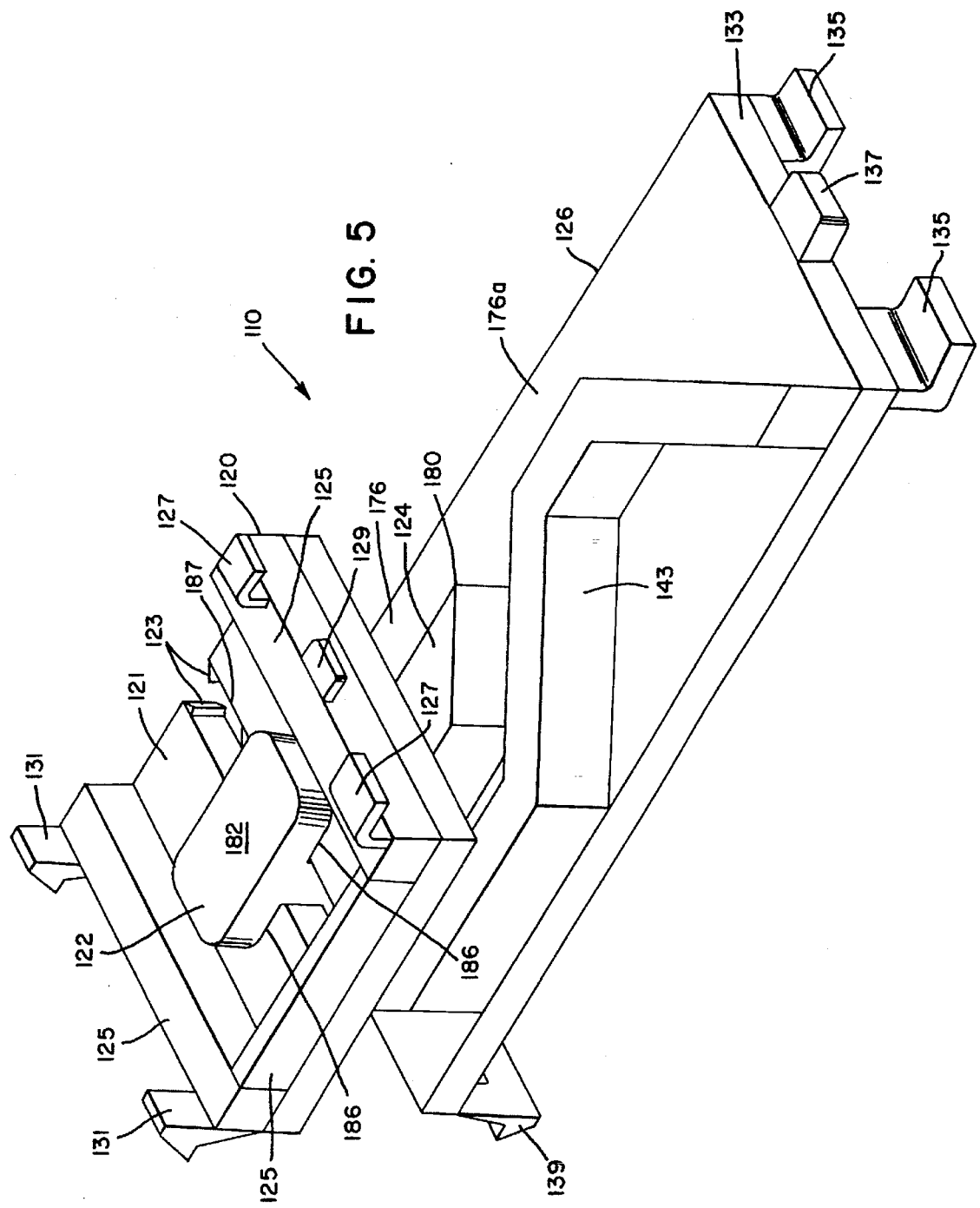

SNAP-IN PUSH-PUSH LATCH MECHANISM

CROSS-REFERENCE TO RELATED PATENT APPLICATIONS

This patent application is a continuation-in-part (CIP) patent application of U.S. patent application Ser. No. 08/368,152 filed on Dec. 12, 1994 in the name of Steven L. Bivens now U.S. Pat. No. 5,518,223.

FIELD OF THE INVENTION

The present invention relates generally to latch mechanisms to be utilized in connection with openable objects or closure members, which are movable in connection with or with respect to a support surface or main body between opened and closed positions, such as, for example, a cup holder, an ashtray, a glove compartment door, or the like, within an automotive vehicle, and more particularly to a latch mechanism, comprising a latch member and a latch track member, which in effect comprises an independent or separate latching entity or unit which may be readily incorporated within or mounted upon, for example, any closure assembly, such as, for example, a cup holder, ashtray, or glove compartment door assembly.

BACKGROUND OF THE INVENTION

As is well-known in the art, openable objects or closure members, such as, for example, a cup holder, an ashtray, a glove compartment door, or the like, are usually provided with a push-push type latch mechanism in order to open and close the objects or closures, or in other words, in order to permit movement of the objects or closures between their opened and closed positions. A push-push type latch mechanism is one in which, for example, an inwardly directed pushing force is impressed upon an opened closure member so as to move the closure member from its opened position to its closed position whereupon the latch mechanism then maintains the closure member at its closed position, and similarly, an inwardly directed pushing force may be subsequently impressed upon the closed and latched closure member so as to initially unlatch or release the latch mechanism whereupon the closure member may be moved to its opened position.

Spring mechanisms are usually operatively associated with the latch mechanisms of the closure assemblies so as to bias the openable objects or closure members toward their opened positions. In addition, the latch mechanisms of the closure assemblies are also usually provided with damping mechanisms in order to properly control the movements of the openable objects or closure members between their opened and closed positions. For example, if an openable object or closure member is permitted to abruptly open relative to its support housing or the like, the impact resulting between such components might not only cause damage to both components, but in addition, will also generate undesirable vibration and noise. If, for example, the openable object or closure member is a glove compartment door pivotably mounted within the dashboard of an automotive vehicle, the sudden impact attendant the opening of the glove compartment door may result in the unwanted discharge of the contents of the glove compartment into the passenger compartment or cabin of the vehicle. Similarly, if the openable object or closure member is an ashtray or cup holder, ashes may be discharged onto the passenger seating areas, or a portion of the liquid contents within the cup being inserted into the cup holder may be spilled.

A spring-biased and damped latch assembly, which is quite suitable for use in connection with the aforenoted types of openable objects or closure members, is disclosed within the present patent application applicant's parent patent application, U.S. patent application Ser. No. 08/368,152 which was filed on Dec. 12, 1994, now U.S. Pat. No. 5,518,223. While the spring-biased and damped latch assembly disclosed within such patent application has of course proven to be quite satisfactory in connection with its spring-biased and damped latching operations, it is of course noted that the latching components per se comprising the latching mechanism are intimately operatively associated with the spring and damping mechanisms. However, it may be desirable in connection with particular closure applications or assemblies to utilize other types of spring and damping mechanisms. Or, alternatively, a particular closure application or assembly may not be able to spatially accommodate the entire latch assembly as disclosed within the aforenoted parent patent application. More particularly, it may be desirable or required, in connection with different closure applications or assemblies, to utilize only the latching components per se of the disclosed latching mechanism. A need therefore exists in the art for a latching mechanism which, in effect, comprises an independent or separate latching entity or unit and which may be readily incorporated within or mounted upon, for example, any closure assembly as desired or required.

In connection with the use of the aforenoted push-push type latch mechanisms, it has sometimes been experienced that an operator, in lieu of impressing a release or unlatching force upon the closure assembly in the inwardly oriented direction, inadvertently tries to release or unlatch the closure member from its latched and closed position by pulling outwardly upon the closure member. Such outwardly directed forces can tend to damage the latch mechanism of the closure assembly whereby the latch mechanism components require replacement or repair. A need therefore exists in the art for a latching mechanism which can withstand or accommodate outwardly directed pulling or latch release forces without experiencing or undergoing damage or operational failure.

In view of the fact that the latching mechanism of the type with which the present patent application is concerned is to be utilized in connection with, for example, closure assemblies incorporated within automotive vehicles, it has also been deemed necessary from a safety viewpoint that if the vehicle experiences or undergoes a crash incident, the closure member should not be able to become unlatched or opened so as to therefore not present a potentially additional structural hazard to the vehicle driver or any of the passengers. A need therefore exists in the art for a latching mechanism which can accommodate excessive or impact forces impressed thereon, oriented or directed, for example, in the inward direction, whereby the latching mechanism will not in fact become unlatched, will not permit the closure member to be released toward its opened position, and will retain the closure member at its latched and closed position.

OBJECTS OF THE INVENTION

Accordingly, it is an object of the present invention to provide a new and improved latch mechanism.

Another object of the present invention is to provide a new and improved latch mechanism of the push-push type.

Still another object of the present invention is to provide a new and improved latch mechanism of the push-push type which, in effect, comprises an independent or separate latching entity or unit which may be readily incorporated within or mounted upon any closure assembly as desired or required.

Yet another object of the present invention is to provide a new and improved latch mechanism of the push-push type which can withstand or accommodate outwardly directed pulling forces, in lieu of inwardly directed pushing forces, without experiencing or undergoing damage or operational failure.

A further object of the present invention is to provide a new and improved latch mechanism of the push-push type which is especially adapted for use in connection with openable objects or closure members, such as, for example, an ashtray, a cup holder, a glove compartment door, or the like, incorporated within an automotive vehicle.

A still further object of the present invention is to provide a new and improved latch mechanism of the push-push type which is especially adapted for use in connection with openable objects or closure members incorporated within an automotive vehicle and which is able to withstand or accommodate excessive or impact forces impressed thereon, or oriented or directed in the inward direction, as might be experienced during an automotive vehicle crash incident whereby the latch mechanism will not become unlatched, will not permit the closure member to be released toward its opened position, and will retain the closure member at its latched and closed position.

SUMMARY OF THE INVENTION

The foregoing and other objects are achieved in accordance with the present invention through the provision of a latch mechanism which comprises a latch member and a latch track member. The latch track member is adapted to be snap-fitted, for example, into a stationary member or component of a closure assembly, while the latch member is adapted to be snap-fitted, for example, into the movable closure member or component of the closure assembly, however, the particular disposition of the latch and latch track members upon the stationary and movable closure members, respectively, may be reversed, it being appreciated that the primary requirement be that relative movement between the stationary and movable closure members be achieved. A unique feature of the latch member is that the same comprises a latch component which is reciprocably movable in a direction transverse to the relative longitudinal movement defined between the latch and latch track members.

In order to provide for the release or unlatching of the latch mechanism in the event that a pulling force, in lieu of a pushing force, is exerted or impressed upon the latch member, the female latch element of the latch track member is provided upon the latch track member as a cantilevered member which therefore inherently exhibits a sufficient or predetermined amount of flexibility with respect to the latch track member so as to permit the male latch element of the latch member to in effect deflect the female latch element and ride over the same as the latch member, and the male latch element thereof, is moved from the inward closed position to the outward opened position.

Similarly, in order to insure the fact that the openable object or closure member is maintained at its closed position such that the openable object or closure member is not permitted to move from its closed and latched position to its opened and unlatched position, and more particularly that the latch member of the latch mechanism is retained at its inward latched position with respect to the latch track member, in the event that severe or excessive impact or pushing forces are impressed upon the closure member, such as, for example, attendant an automotive vehicle crash incident, the latch track member of the latch mechanism is provided with an auxiliary chamber or cavity which is normally separated from the track portion of the latch track member such that during normal operation, the male latch element will traverse the track portion of the latch track member in accordance with the normal latching and unlatching operations. However, during that period of time that the vehicle experiences, for example, a crash incident whereby excessive or severe impact forces may be impressed upon the closure member, the male latch element will be forced into the auxiliary chamber or cavity of the latch track member so as to be physically retained within such chamber or cavity until operator personnel manually reset the latch mechanism whereby the male and female latch elements are again disposed in their normal positions relative to each other.

BRIEF DESCRIPTION OF THE DRAWINGS

Various other objects, features, and attendant advantages of the present invention will be more fully appreciated from the following detailed description when considered in connection with the accompanying drawings in which like reference characters designate like or corresponding parts throughout the several views, and wherein:

FIG. 1 is a perspective view of an air damper assembly within which a latching mechanism of the push-push type, and similar to the push-push type latching mechanism of the present invention, is employed;

FIG. 2 is a cross-sectional view of of the air damper assembly of FIG. 1 as taken along the line 2—2 of FIG. 1;

FIG. 3 is a perspective view of the latch component of the latch member of the air damper assembly shown in FIG. 1;

FIG. 5 is a perspective view of the new and improved push-push type latch mechanism constructed in accordance with the present invention and showing the latch member and the latch track member disposed together in their operative assembled state;

DETAILED DESCRIPTION OF THE ILLUSTRATED EMBODIMENTS

Figure 4:
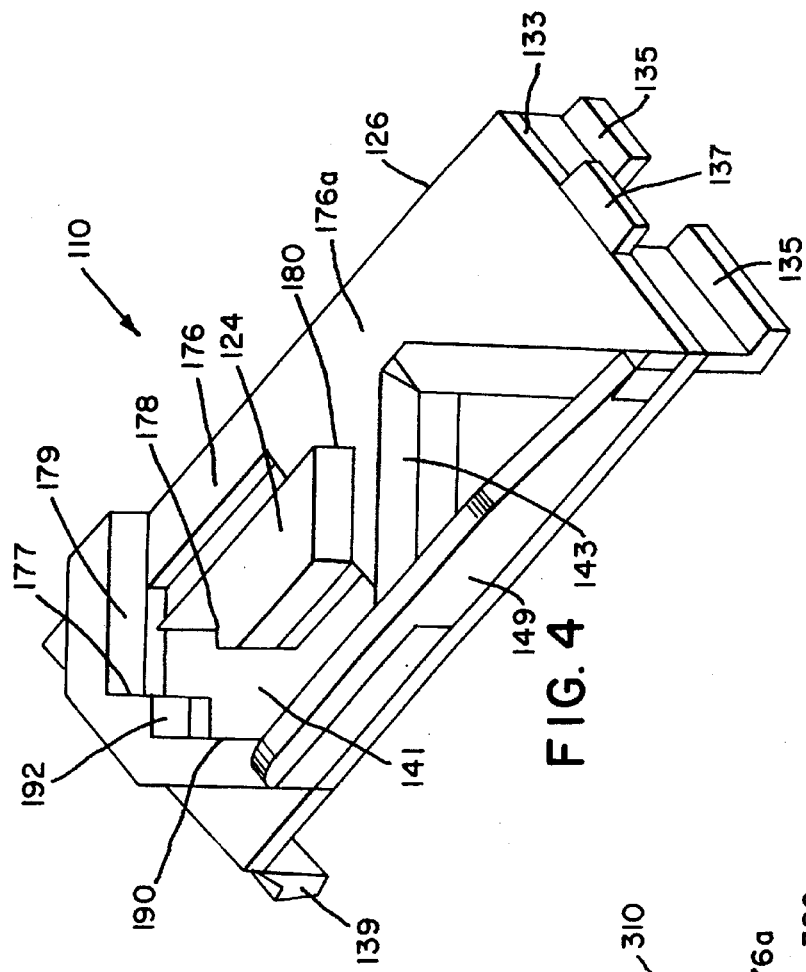
FIG. 4 is a perspective view of the latch track member of the new and improved push-push type latch mechanism constructed in accordance with the present invention.

Referring now to the drawings, and more particularly to FIGS. 1–3 thereof, an air damper assembly within which a latching mechanism of the push-push type, and similar to the push-push type latching mechanism of the present invention, is employed will be described first, and subsequently, the push-push type latching mechanism of the present invention, which could be employed within the air damper assembly of FIGS. 1–3, or within any other similar assembly operatively associated with an openable object or closure member, will be described. An air damper assembly of the type generally described or referred to hereinbefore is generally indicated by the reference character 10 and is provided for controlling the damping rate of an openable object or closure member, not shown, such as, for example, a cup holder, ashtray, or glove compartment door installed within the interior of an automotive vehicle and movable with respect to a main body, support plate, or housing mounted within a dashboard or center console of the vehicle. In other words, the air damper assembly 10 is used to push the openable object or closure member outwardly to its opened position at a dampened or controlled rate of speed and to permit the openable object or closure member to be pushed inwardly to its closed position at an undampened or higher rate of speed and with a reduced force.

In accordance with the exemplary air damper assembly 10 illustrated in FIGS. 1–3, the assembly 10 is seen to comprise a cylindrically-shaped housing 12, a piston rod 14, a lip seal member 16, a coil spring 18, and an anti-twist end cap 19. The damper assembly 10 also comprises a latching member 20, which has a latching component 22 reciprocably mounted thereon, and a female latching element 24 which is fixedly mounted upon a latch track member 26 of the piston rod 14, a male latching element 28 being provided upon the latching component 22 so as to be engageable with the latch track member 26 and the female latching element 24 of the piston rod 14. The cylindrically-shaped housing 12 is open at its front end and closed at its rear end by means of an end wall 30. The piston rod 14 is reciprocably movable with respect to the housing 12 and is provided at its rear end with a piston head 32 which effectively divides the interior of the housing 12 into a head chamber 34 and a rod chamber 36. The piston head 32 comprises a pair of axially spaced circular plate members 38a and 38b which are integrally connected together by means of an annularly recessed portion 40 having a diametrical extent which is less than the diametrical extents of either one of the circular plate members 38a and 38b. The lip seal member 16 is disposed within an annular groove 42 defined within the outer peripheral surface of the recessed portion 40. A U-shaped slot or channel 46 is defined within the piston head 32 so as to fluidically interconnect outer peripheral surface portions of the circular plate members 38a and 38b and thereby, in turn, fluidically interconnect the head chamber 34 and the rod chamber 36. The coil spring 18 is disposed within the head chamber 34 so as to be interposed between the end wall 30 and the rear side of plate member 38a.

Adjacent to the free or distal end 60 of the piston rod 14, there is provided an aperture 64 by means of which the piston rod 14 may be suitably attached to the openable object or closure member, and the closed end of the housing 12 may likewise be suitably provided with mounting means, not shown, for attaching the same to the closure housing provided, for example, within the dashboard or center console of the automotive vehicle. Alternatively, the piston rod 14 may be connected or attached to the closure housing while the housing 12 is connected or attached to the closure member. The open or front end of the cylindrical housing 12 has the latching member 20 integrally formed therewith, and the latter is adapted to mount the anti-twist end cap 19 thereon. The cap 19 comprises a front face portion 66 within which is defined an aperture 68 which has a configuration which, in effect, matches the cross-sectional configuration of the piston rod 14 such that the piston rod 14 is prevented from rotating or twisting relative to the cap 19 and housing 12 when the piston rod 14 is being reciprocably moved between its extended and retracted positions with respect to housing 12. Upper and lower marginal portions of the front face portion 66 of the cap 19 are provided with axially extending flexible leg members 70, and the rear end portions of the leg members 70 are provided with prongs or detents 72 for snap-fitting engagement within apertures 74 defined within upper and lower surface portions of the latching member 20. In this manner, end cap 19 is fixedly mounted upon the latching member portion 20 of the cylindrical housing 12.

The female latching element 24 is mounted upon the latch track member 26 of the piston rod 14 at a position adjacent to the free or distal end 60 of the piston rod 14, and a latch track 76 is defined upon the latch track member 26 so as to effectively encircle the female latching element 24. The female latching element 24 includes a V-shaped or concave latching portion 78 provided upon its right or forward end, and a pointed convex tip portion 80 provided upon its left or rear end. The tip portion 80 is disposed adjacent to a longitudinally extending latch track portion 76a. The latching component 22 comprises a main body portion 82 to which is integrally fixed the substantially diamond-shaped male latching element 28. The main body portion 82 has a pair of cut-out portions 86 defined within side wall portions thereof, which provide the main body portion 82 with a substantially H-shaped cross-sectional configuration, and as a result of such structure, the main body portion 82 is able to be slidably disposed within a slot 87 defined within a side wall portion of latching member 20. The male latching element 28 is provided with surfaces 88 which engage the various portions of the latch track 76 as well as female latching element 24.

The operation of the air damper assembly 10 will now be described. In the closed, fully retracted, and latched position, the coil spring 18 will be compressed and the piston rod 14 is held in its latched position interiorly within the housing 12 until opening of the openable object or closure member is required. This latching of the piston rod 14 is achieved by means of two of the adjacent surfaces 88 of the male latching element 28 being disposed within the V-shaped latching portion 78 of the female latching element 24. In order to activate the assembly 10 and move the openable object or closure member to its opened position, the front end 60 of the piston rod 14, to which the openable object or closure member is attached, is pushed slightly to the left or inwardly into the housing 12, and is then released. As a result of such movement, the surfaces 88 of the male latching element 28 which were engaged with the V-shaped latching portion 78 of the female latching element 24 will be released from the V-shaped latching portion 78, and two other surfaces 88 of the male latching element 28 will engage side wall portions 92 and 90 of the latch track member 26 whereby, in effect, the male latching element 28 is moved away from the female latching element 24. This permits the coil spring 18 to push the piston rod 14 outwardly from the cylindrical housing 12 whereby the male latching element 28 will be relatively moved along the lower portion of the latch track 76 and then along the longitudinally extending latch track portion 76a.

As the piston rod 14 is moved to the right by means of the biasing force of the coil spring 18, the outer peripheral portion of the lip seal member 16 engages the inner peripheral sidewall 44 of the cylindrical housing 12 so as to block all air flow between the head chamber 34 and the rod chamber 36 except through the U-shaped slot or channel 46. Therefore, the piston rod 14, and the openable object or closure member connected thereto, is caused to move outwardly at a dampened or controlled rate of speed. When it is desired to move the openable object or closure member back to its closed position, the front end 60 of the piston rod 14 is pushed inwardly to the left. The male latching element 28 of the latching component 22 is thus caused to move initially along the latch track portion 76a, and one of the surfaces 88 of the male latching element 28 will engage the tip portion 80 of the female latching element 24 whereby the male latching element 28 is forced to move along the upper part of the latch track 76 until the surfaces 88 of the male latching element encounter latch track wall surface portions 77 and 79. The front end 60 of the piston rod 14 is then released, and consequently, the surfaces 88 of the male latching element 28 will again contact and engage the V-shaped latching portion 78 of the female latching element 24 whereby the piston rod 14 is maintained at its inward, retracted, or closed and latched position. It will be appreciated that as the piston rod 14 is moved inwardly to the left, the outer peripheral portion of the lip seal member 16 tends to collapse radially inwardly so as not to engage the inner peripheral wall 44 of the housing 12 whereby air trapped within the head chamber 34 can be rapidly exhausted from the head chamber 34 and into the rod chamber 36, as a result of bypassing the outer peripheral portion of the lip seal member 16 as well as flow through the U-shaped slot or channel 46, thereby facilitating closing of the openable object or closure member at a rela-closing of the openable object or closure member at a relatively high undampened rate of speed.

As has been noted hereinbefore, the latching member 20, which has the latching component 22 movably mounted thereon and wherein the component 22 in turn has the male latching element 28 integrally incorporated thereon, and the piston rod 14, which has the latch track member 26 integrally incorporated thereon and wherein the latch track member 26 in turn has the female latching element 24 integrally incorporated thereon, are components of the air damper assembly 10. However, not all applications or systems within which a push-push type latch mechanism is to be incorporated in connection with an openable object or closure member requires the use of a damper assembly. Alternatively, the particular application or system may not require, or may not be able to physically accommodate, an overall damper assembly having the structure of the assembly 10 disclosed within FIGS. 1–3. In those instances, it is highly desirable to provide a push-push latch mechanism which, in effect, comprises an independent entity or sub-assembly which solely comprises the necessary latching components to form an operative push-push type latch mechanism and which may be incorporated within any type of closure assembly as desired or required.

The present invention is therefore directed toward the provision of such an independent push-push type latch mechanism which by itself comprises a latch unit or entity which may be incorporated within any type of closure assembly without having to be integrally operatively associated with or connected to other components of known closure latching systems or assemblies. The new and improved push-push type latch mechanism comprising an independent or separate unit or entity and which may be incorporated or mounted upon any type of closure assembly as desired or required, and as constructed in accordance with the teachings of the present invention, is shown in FIGS. 4 and 5 and is generally indicated by the reference character 110. It is to be noted that the various parts of the latch mechanism 110 which correspond to similar parts of the assembly 10 have been given similar reference characters except that the reference characters of the latch mechanism 110 of FIGS. 4 and 5 are in the 100 series. More particularly, the latch mechanism 110 comprises a latching member 120 and a latch track member 126. The latching member 120 comprises a base portion 121 having a substantially square-shaped configuration, and a slot 187 is defined therethrough. A latching component 122 is adapted to be slidably movable within the slot 187 in a manner similar to the movable disposition of the latching component 22 with respect to the slot 87 of the latching member 20 of the assembly of FIG. 1. The latching component 122 comprises a main body portion 182 provided with cut-out portions 186 defined within side wall portions thereof such that the main body portion 182 has a substantially H-shaped cross-sectional configuration similar to the main body portion 82 of the latching component 22. The latching component 122 is of course also provided with a male latching element, not actually shown, which is similar to the male latching element 28 of the latching component 22. Detents 123 are provided at the open entranceway to the slot 187 so as to permit insertion of the latching component 122 within the slot 187 of the base portion 121 whereupon after entry of the latching component 122 within the slot 187, the detents 123 retain the latching component 122 therewithin.

Upstanding rib members 125 are provided atop the base portion 121 so as to extend along the three sides thereof other than the side within which the slot entranceway is defined, and in order to mount the latching member 120 within, for example, an openable object or closure member, each one of the pair of rib members 125 which are disposed opposite each other is provided with suitable mounting means which enables the latching member 120 to be snap-fitted within the openable object or closure member. More particularly, the openable object or closure member will comprise a support panel which will be provided, for example, with a substantially square-shaped aperture, and one of the oppositely disposed rib members 125 of the latching member 120 will have integrally mounted thereon a pair of laterally spaced, substantially inverted L-shaped mounting brackets 127 located at the opposite ends of the rib member 125, and a third plate-shaped mounting bracket 129 centrally located upon the rib member 125. The lower surfaces of the brackets 127 are disposed within a plane vertically separated from the upper surface of bracket 129 so as to accommodate an edge portion of the square-shaped aperture of the support panel of the openable object or closure member when that side portion of the latching member 120 is mounted upon the support panel of the openable object or closure member. The other oppositely disposed rib member 125 is provided with a pair of upstanding, laterally spaced flexible detent members 131 for snap-fittingly engaging an opposite edge portion of the square-shaped aperture of the support panel of the openable object or closure member, after the bracket members 127 and 129 have been mounted upon the support panel of the closure member, such that the latching member 120 is securely but removably mounted upon the closure member.

In a similar manner, the latch track member 126 is also provided with mounting means which permits the latch track member 126 to be snap-fittingly mounted within, for example, a suitable aperture defined within a stationary housing or the like with which the openable object or closure is operatively associated. More particularly, the latch track member 126 comprises a base portion 133 which has a substantially rectangular configuration and upon which the latch track 176 and latch track portion 176a are defined. The remaining structural components of the latch track member 126, comprising, for example, the female latching element 124 and the various wall portions 177, 179, 190, and 192, will not be described in detail in view of the fact that such components are precisely the same as their counterparts disclosed within the embodiment of FIG. 2. As was the case with the latching member 120, the latch track member 126 is provided, along one of the short sides thereof, with a pair of dependent, laterally spaced, substantially L-shaped bracket members 135 disposed at the corners of the base portion 133, and a centrally located bracket 137. The upper surfaces of the brackets 135 are vertically separated from the lower or undersurface of the bracket 137 so as to accommodate an edge portion of the aperture, defined within the closure housing, within which the latch track member 126 is to be mounted when that side of the latch track member 126, upon which the brackets 135 and 137 are provided, is inserted into the closure housing aperture. The opposite short side of the latch track member 126 is provided with a pair of dependent, laterally spaced flexible detent members 139, only one of which is shown, for snap-fittingly engaging an opposite edge portion of the aperture defined within the closure housing after the bracket members 135 and 137 have been engaged with the first edge portion of the closure housing.

In accordance, therefore, with the foregoing, it is to be appreciated that in accordance with the teachings of the present invention, the latching member 120 and the latch track member 126 together comprise a latch mechanism 110 which is a separate and independent latching entity or unit which may be readily incorporated within or mounted upon any openable object or closure member, and the corresponding support body or housing thereof, of any closure assembly. All that is required is that suitable apertures, within which the latching member 120 and the latch track member 126 would be snap-fittingly engaged, be provided within the openable object or closure member, and the support body or closure housing, respectively. In this manner, closure assemblies can be more diversified or versatile in view of the fact that the only the latch mechanism 110 per se need be accommodated within the closure assembly, and at any desired location within the closure assembly, as opposed to the need for like-wise accommodating the other components of the latching assembly as disclosed, for example, within FIGS. 1 AND 2.

In addition to the foregoing structural features defining the unique separate and independent latch mechanism entity or unit 110 of the present invention, with continued reference being made to FIG. 4, it is also seen that unlike the latch track member 26 of the latch mechanism of, for example, FIG. 2, a portion of the latch track portion 176, of the latch track member 126 of the latch mechanism 110, which annularly surrounds the female latching element 124 is cored-out or removed as at 141 such that the end of the female latching element 124, upon which the V-shaped latching portion 178 is defined, is in effect formed as a cantilevered structure with respect to the remaining portion of the latch track member 126. This cantilevered structure provides the free or distal end portion of the female latching element 124, upon which the V-shaped latching portion 178 is defined, with a predetermined amount of flexibility. Consequently, when the latching member 120 and the latch track member 126 of the latch mechanism 110 are disposed with respect to each other such that the male latching element of the latching component 122 is engaged with the V-shaped latching portion 178 of the female latching element 124, and should an operator or user attempt to open the openable object or closure member by exerting a pulling force on the openable object or closure member in lieu of exerting a pushing force thereon, the free or distal cantilevered end portion of the female latching element 124 will be able to flex downwardly and thereby permit the male latching element of the latching component 122 to ride thereover. The latch track member 126 is further provided with an upstanding, substantially V-shaped rib member 143 which not only serves to properly guide the male latching element of the latching component 122 toward the longitudinally extending latch track portion 176a under normal operating conditions, but in the instance just described wherein the male latching element of the latching component rides over the female latching element 124, the male latching element of the latching component 122 will encounter the rib member 143 and likewise be guided thereby toward the latch track portion 176a.

Figure 9:
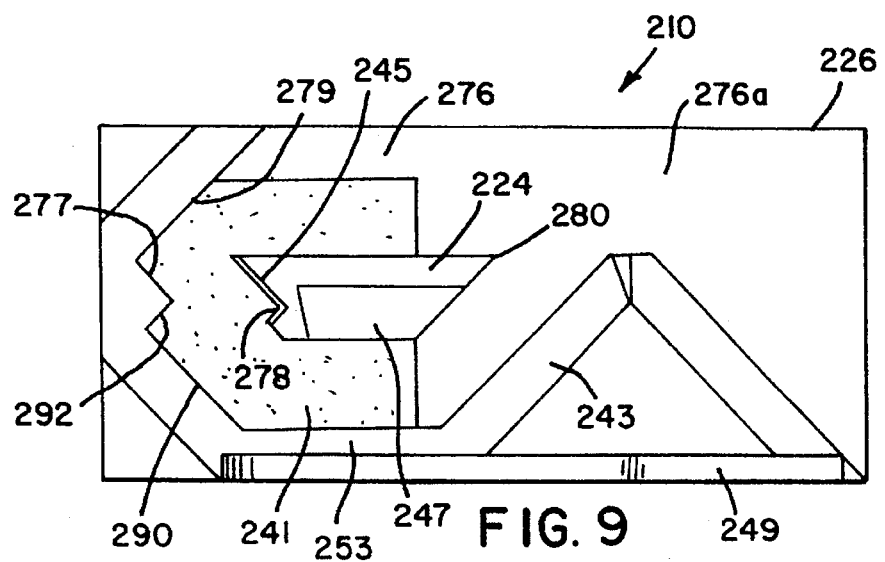
FIG. 9 is a plan view similar to that of FIGS. 7 and 8 showing, however, a fourth embodiment of a modified latch track member for use within the push-push type latch mechanism assembly of FIG. 5 for enabling opening of the openable object or closure member from its inward closed and latched position to its outward opened and unlatched position, when the openable object or closure member is subjected to outward pulling forces in lieu of inward pushing forces, such that damage to and operational failure of the latch mechanism assembly is effectively prevented.

In order to further assist the movement of the male latching element of the latching component over the female latching element in the instance just described wherein pulling forces, in lieu of pushing forces, are exerted upon the openable object or closure member, the female latching element may be provided with the modified structure illustrated in FIG. 9 wherein the various structural components of the latch mechanism, generally indicated by the reference character 210, which correspond to similar structural components of the previous embodiments have been given similar reference characters except that the new reference characters of the embodiment of FIG. 9 are in the 200 series. More particularly, the free or distal end portion of the female latching element 224, within which the V-shaped latching portion 278 is defined, is provided with a chamfered or upwardly ramped region 245 which extends upon both opposite sides of the V-shaped latching portion 278 such that the overriding movement of the male latching element of the latching component is facilitated. In addition, the female latching element 224 is also provided with a recessed or depressed socket portion 247 which extends from the region adjacent to the V-shaped latching portion 278 toward the tip portion 280. In this manner, the amount of upward deflection of the male latching element of the latching component is reduced, once the male latching element has ridden over the chamfered or ramped region 245 associated with the V-shaped latching portion 278, and the male latching element can be guided toward the rib member 243 and the longitudinally extending latch track portion 276a. It is lastly to be noted that in connection with the embodiments of FIGS. 4 and 9 that the latch track members 126 and 226 are also provided with an upstanding rib member 149 and 249, respectively, which are provided upon each one of the latch track members 126 and 226 so as to extend along the longer side edge portion of the respective latch track member 126 and 226 which is operatively associated with the V-shaped rib member 143. The rib members 149 and 249 are provided so as to maintain the proper vertical separation or relative disposition defined between the latching member 120 and the latch track member 126, as well as between the corresponding latching member, not shown, and its corresponding latch track member 226. It is also noted that the rib member 149 has not been shown in connection with latch track member 126 as illustrated in FIG. 5.

Figure 6:
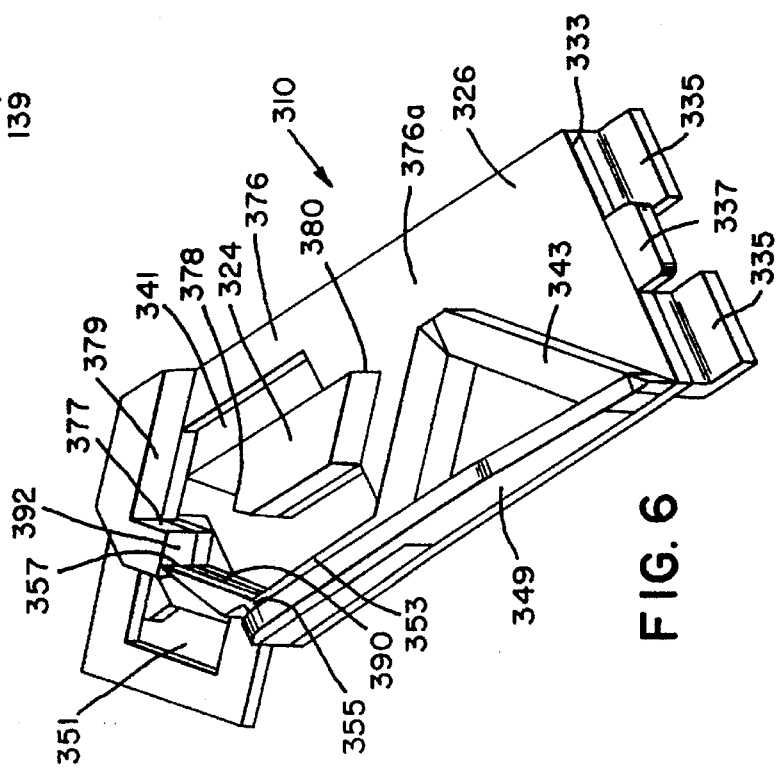
FIG. 6 is a perspective view similar to that of FIG. 4 showing, however, a first embodiment of a modified latch track member for use within the push-push type latch mechanism assembly of FIG. 5 whereby such modified latch track member can retain the openable object or closure member at its inward closed and latched position even when the openable object or closure member is subjected to excessive or severe impact or pushing forces.

In view of the fact that the latch mechanism of the present invention is to be incorporated within closure assemblies, which are incorporated within automotive vehicles, it is desirable to insure that the openable object or closure member remains in a closed position or state despite the fact that the openable object or closure member may have an excessive pushing force impressed thereon as a result of, for example, the vehicle driver or a vehicle passenger encountering the openable object or closure member during a collision incident. More particularly, therefore, it is desirable to insure that the male latching element is retained in a latched position within the latch mechanism and not in effect released from a latched position within the latch mechanism so as to in fact prevent the opening of the openable object or closure member. Referring then to FIG. 6, a modified embodiment of the latch track member is disclosed wherein the various structural components thereof which correspond to similar structural components of the previous embodiments are provided with reference characters similar to those of the previous embodiments except that the corresponding reference characters of this embodiment are in the 300 series. More particularly it is seen that the latch track member 326 has a socket portion or region 351 which is provided within the vicinity of the wall portion 390 which forms an integral part of latch track 376. Wall portion 390, however, is provided as a hinged wall section which is flexibly connected to a longitudinally extending portion 353 of V-shaped rib member 343 by means of a living hinge structure 355. The opposite end of wall portion 390, which is adjacent to wall portion 392, is connected to wall portion 392 by means of a frangible connection 357.

Consequently, during normal operation of the latch mechanism 310 of FIG. 6, and in particular during a latch release mode of operation wherein a normal pushing force is impressed upon the openable object or closure member, the male latching element, not shown, of the latching component, also not shown, which is engaged within the V-shaped latching portion 378 of the female latching member 324, will be moved outwardly from the V-shaped latching portion 378 of the female latching member 324, it will encounter the wall portion 390, and move along the longitudinally extending wall portion 353 toward the longitudinally extending latch track portion 376a. However, should the openable object or closure member experience an excessive pushing force, as might be impressed thereon as a result of an automotive accident incident, the male latching element of the latching component will be forcefully moved from its latched position with respect to the V-shaped latching portion 378 of the female latching member 324 and into engagement with the wall portion 390 whereupon the frangible connection 357 defined between the wall portion 390 and the wall portion 392 will be broken, the wall portion 390 will pivot about its hinge mechanism 355, and the male latching element of the latching component will be forced into socket portion 351 and trapped therewith by means of the hinged wall portion 390 which has now returned to its normal position. Consequently, the latching component is not able to be moved to its released position with respect to the latch track member whereby the openable object or closure member is retained in its closed and latched position so as not to present a hazard to the automotive vehicle driver or passenger if the openable object or closure member was otherwise permitted to be moved to its opened position during such an automotive accident incident. The latch mechanism 310 can of course be subsequently reset to its normal operative disposition by maintenance or repair personnel. In addition, it is to be noted that the frangible connection 357 defined between the wall portions 390 and 392 could include an additional wall portion or rib member, not shown, which would prevent the wall member 390 from moving toward the female latching element 324 so as to thereby insure retention of the male latching element within the socket portion 351.

Figure 7:
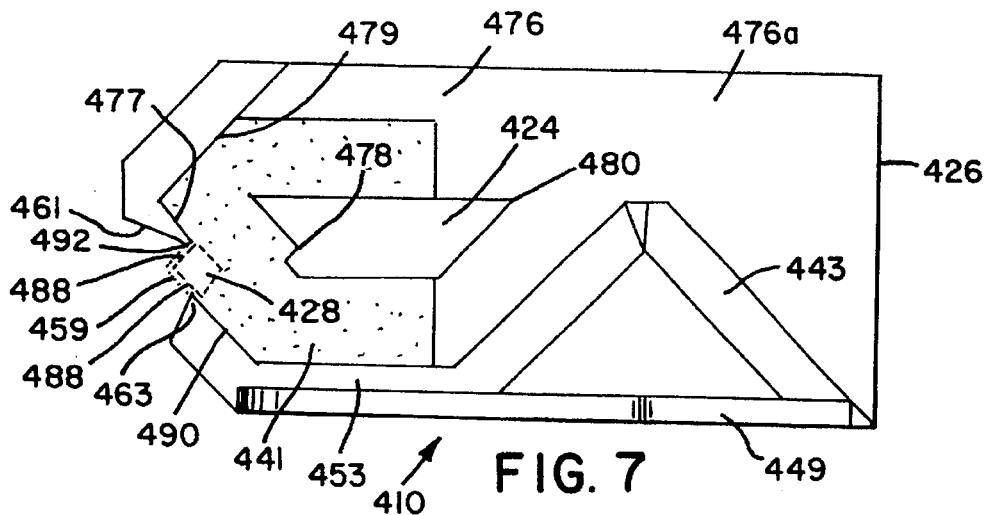
FIG. 7 is a plan view of a second embodiment of a modified latch track member for use within the push-push type latch mechanism assembly of FIG. 5 for also retaining the openable object or closure member at its inward closed and latched position even when the openable object or closure member is subjected to excessive or severe impact or pushing forces.

Referring now to FIG. 7, another embodiment is disclosed which is similar to the embodiment of FIG. 6 in that this embodiment likewise provides for the accommodation of severe or excessive impact forces being impressed upon the openable object or closure member so as to nevertheless retain the openable object or closure member in its closed and latched position or state, the structural components of this embodiment which are similar to the corresponding components of the previously discussed embodiments being provided with similar reference characters except that they are in the 400 series. More particularly, in lieu of the hinged wall portion 390 of the embodiment of FIG. 6, the corresponding wall portion 490 is shortened in its length as is corresponding wall portion 492 such that a space 459 is defined therebetween. The exterior region of wall portion 477 is also angled inwardly as at 461 and toward the inner wall surface of wall portion 477 such that wall portion 492 is defined therebetween. In addition, this structure comprising wall portion 477 effectively disposes wall portion 492 upon a somewhat flexible detent which, along with the terminal end portion 463 of wall portion 490, serves to define the space 459 therebetween. The space 459 has a predetermined size with respect to the male latching element 428 such that under normal operation, as illustrated, when the male latching element 428 has been moved away from the V-shaped latching portion 478 of the female latching element 424, two surfaces 488 of the male latching element 428 will encounter wall portion 492 and terminal end portion 463 of wall portion 490 so as to be guided along wall portion 490, rib portion 453, and rib member 443 toward longitudinally extending latch track portion 476a. Under excessive or severe impact forces, however, being impressed upon the openable object or closure member to which the male latching element 428 is connected, the male latching element 428 will be forcefully introduced into space 459 such that the element 428 will impact against wall portion 492 and terminal end portion 463 of wall portion 490 so as to cause flexing of the cantilevered wall assembly 477–492 whereby the male latching element 428 will be forced through space 459, will then be disposed upon the opposite side of wall portion 492 and terminal end portion 463 of wall portion 490, and will be accordingly retained in such position until maintenance or repair personnel reset the latch mechanism 410 to its normal disposition.

Figure 8:
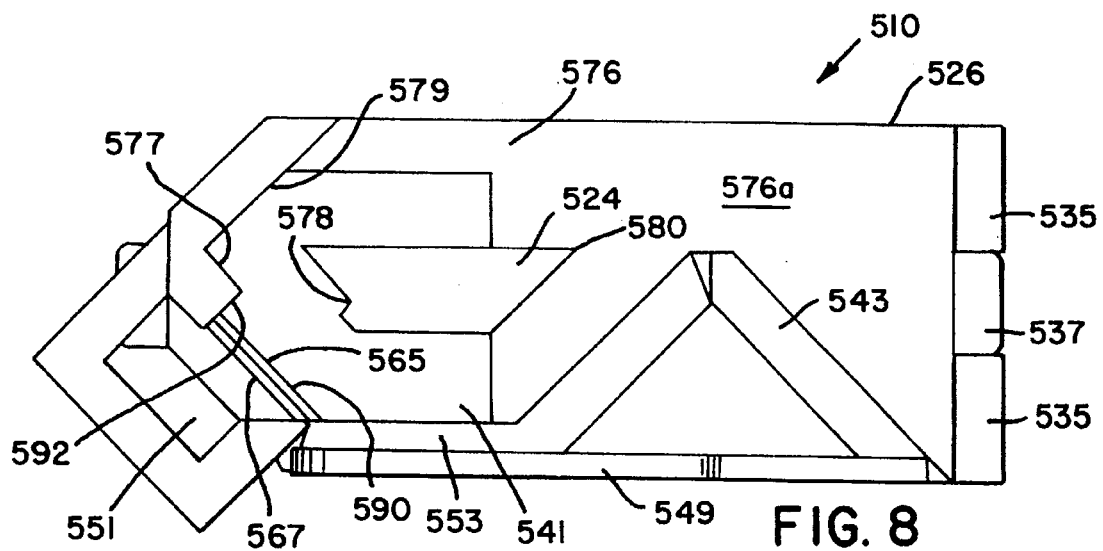
FIG. 8 is a plan view similar to that of FIG. 7 showing, however, a third embodiment of a modified latch track member for use within the push-push type latch mechanism assembly of FIG. 5 for also retaining the openable object or closure member at its inward closed and latched position even when the openable object or closure member is subjected to excessive or severe impact or pushing forces.

With reference now being lastly made to FIG. 8, an additional embodiment of the present invention, which is similar to the embodiment of FIG. 6, is disclosed for likewise preventing the release of the male latching element and the openable object or closure member from the closed and latched position to the opened and unlatched position under those conditions in which the openable object or closure member is subjected to excessive or severe pushing or impact forces. It is noted that the structural components of this embodiment, which correspond to those components of the previous embodiments, are provided with similar reference characters except they are in the 500 series. More particularly, in lieu of the pivotable hinged wall portion 390 of the embodiment of FIG. 6, wall portion 590 is provided with an upwardly directed or inclined ramp portion 565 and a downwardly directed or inclined ramp portion 567 wherein the latter leads into the socket or recessed region 551. In this manner, should excessive or severe pushing or impact forces be impressed upon the openable object or closure member, the male latching element will in effect be forced upwardly upon upwardly inclined ramp portion 565 whereupon it will then proceed downwardly over downwardly inclined ramp portion 567 and thereby be effectively trapped within the socket portion or region 551. The male latching element, and the openable object or closure member operatively connected thereto, will therefore be retained in its inward, closed, and latched position until maintenance or repair personnel reset the latch mechanism 510 to its normal disposition.

Thus it may be seen that in accordance with the teachings of the present invention, a new and improved latch mechanism which comprises an independent entity or unit and which may be readily mounted upon an openable object or closure member, and its associated housing or support panel, has been disclosed. In addition, the latch track member of the latch mechanism is provided with means for permitting release of the male latching element of the latching component from the female latching element of the latch track member without damage or destruction of the latch mechanism components. Still further, the latch track member is provided with additional means for retaining the male latching element of the latching component at an inward, closed, and latched position with respect to the latch track member so as to prevent undesirable opening of the openable object or closure member under excessive impact or pushing forces, as might be experienced attendant an automotive vehicle accident, whereby the openable object or closure member, retained at its inward, closed, and latched position does not present a hazardous condition to the vehicle driver or passenger.

Obviously, many modifications and variations of the present invention are possible in light of the above teachings. It is therefore to be understood that within the scope of the appended claims, the present invention may be practiced otherwise than as specifically described herein.

What is new and desired to be protected by Letters Patent of the United States is:

1. A latch mechanism for releasably latching a closure member at a latched position with respect to a closure housing, comprising:

a latching member having means integrally formed thereon for releasably mounting said latching member upon a closure member;

a latch track member having means integrally formed thereon for releasably mounting said latch track member upon a closure housing;

first latch means provided upon said latch track member; and second latch means provided upon said latching member for releasably engaging said first latch means of said latch track member so as to latch said closure member at a closed and latched position with respect to said closure housing when said second latch means of said latching member is operatively engaged with said first latch means of said latch track member, and to permit said closure member to move from said closed and latched position to an unlatched and opened position with respect to said closure housing when said second latch means of said latching member is disengaged from said first latch means of said latch track member.

2. A latch mechanism as set forth in claim 1, wherein:

said second latch means comprises a first portion slidably mounted upon said latching member and a second portion operatively engageable with said first latch means of said latch track member.

3. A latch mechanism as set forth in claim 2, wherein:

said first and second portions of said second latch means are integrally formed together such that said second latch means comprising said first and second portions comprises a one-piece latching component.

4. A latch mechanism as set forth in claim 2, wherein:

said latching member is moved along with said closure member in one of two opposite longitudinal directions with respect to said latch track member and said closure housing; and said second latch means is slidably disposed upon said latching member in a direction transverse to said opposite longitudinal directions.

5. A latch mechanism as set forth in claim 2, wherein:

said first latch means of said latch track member comprises a substantially V-shaped female latching element; and said second portion of said second latch means comprises a substantially diamond-shaped male latching element for operatively engaging said substantially V-shaped female latching element of said latch track member when said latching member and said closure member are pushed inwardly from said opened and unlatched position and then released, and for disengaging said substantially V-shaped female latching element of said latch track member when said latching member and said closure member are pushed slightly inwardly from said closed and latched position and then released, whereby said latch mechanism comprises a push-push type latch mechanism.

6. A latch mechanism as set forth in claim 5, further comprising:

means mounting said substantially V-shaped female latching element upon said latch track member for facilitating disengagement of said male latching element from said substantially V-shaped female latching element if an outwardly directed pulling force is exerted upon said latching member and said closure member.

7. A latch mechanism as set forth in claim 6, wherein said means mounting said substantially V-shaped female latching element comprises:

aperture means defined within said latch track member for surrounding said female latching element upon three sides thereof whereby said female latching element comprises a flexible cantilevered latching element, whereupon an outwardly directed pulling force is exerted upon said latching member and said closure member, said female latching element of said latch track member will be flexed downwardly and said male latching element of said latching member will move over said downwardly flexed female latching element.

8. A latch mechanism as set forth in claim 7, wherein:

said female latching element comprises upwardly inclined ramp means for facilitating said movement of said male latching element over said downwardly flexed female latching element.

9. A latch mechanism as set forth in claim 8, further comprising:

depressed socket means defined upon said female latching element for facilitating said movement of said male latching element, said latching member, and said closure member toward said opened and unlatched position.

10. A latch mechanism as set forth in claim 5, further comprising:

means defined upon said latch track member for retaining said male latching element of said second latch means of said latching member latched upon said latch track member when an excessive pushing force is exerted upon said closure member and said latching member so as to prevent said latching member and said closure member from moving to said opened and unlatched position with respect to said latch track member and said closure housing.

11. A latch mechanism as set forth in claim 10, wherein said retaining means defined upon said latch track member comprises:

a socket region defined upon said latch track member; and hinged wall means, separating said socket region and a latch track portion of said latch track member, for opening into said socket region when said male latching element impacts against said hinged wall means with said excessive pushing force so as to permit said male latching element to enter said socket region, and for closing said socket region after said male latching element has entered said socket region so as to retain said male latching element within said socket region.

12. A latch mechanism as set forth in claim 10, wherein said retaining means defined upon said latch track member comprises:

a socket region defined upon said latch track member; and inclined ramp means, separating said socket region and a latch track portion of said latch track member, for facilitating entrance of said male latching element into said socket region when said male latching element impacts against said inclined ramp means with said excessive pushing force, and for preventing retraction of said male latching element back out of said socket region so as to retain said male latching element within said socket region.

13. A latch mechanism as set forth in claim 10, wherein said retaining means defined upon said latch track member comprises:

aperture means defined within a wall portion of said latch track member so as to connect a latch track portion of said latch track member with a region of said latch track member disposed behind said wall portion of said latch track member; and one part of said wall portion comprises flexible detent means for permitting said male latching element to pass through said aperture means defined within said wall portion of said latch track member when said male latching element impacts against said flexible detent means with said excessive pushing force and into said region of said latch track member disposed behind said wall portion of said latch track member, and for preventing passage of said male latching element back through said aperture means and past said flexible detent means so as to retain said male latching element within said region of said latch track member disposed behind said wall portion of said latch track member.

14. A latch mechanism as set forth in claim 2, wherein:

said latching member has a slot formed therein; and said first portion of said second latch means comprises a substantially rectangularly-shaped body portion having a substantially H-shaped cross-sectional configuration for slidable movement within said slot formed within said latching member.

15. A latch mechanism as set forth in claim 1 wherein said means integrally formed upon said latching member for releasably mounting said latching member upon a closure member, comprises:

bracket means provided upon one side of said latching member for engaging an edge portion of an aperture defined within a closure member; and snap-fitting means provided upon an opposite side of said latching member for snap-fittingly engaging an opposite edge portion of said aperture defined within said closure member.

16. A latch mechanism as set forth in claim 1, wherein said means integrally formed upon said latch track member for releasably mounting said latch track member upon a closure housing, comprises:

bracket means provided upon one side of said latch track member for engaging an edge portion of an aperture defined within a closure housing; and snap-fitting means provided upon an opposite side of said latch track member for snap-fittingly engaging an opposite edge portion of said aperture defined within said closure housing.

17. A latch mechanism for releasably latching a closure member at a latched position with respect to a closure housing, comprising:

a latching member having means integrally formed thereon for releasably mounting said latching member upon one of two structures comprising a closure member and a closure housing;

a latch track member having means integrally formed thereon for releasably mounting said latch track member upon the other one of said two structures comprising said closure member and said closure housing;

first latch means provided upon said latch track member; and second latch means provided upon said latching member for releasably engaging said first latch means of said latch track member so as to latch said closure member at a closed and latched position with respect to said closure housing when said second latch means of said latching member is operatively engaged with said first latch means of said latch track member, and to permit said closure member to move from said closed and latched position to an unlatched and opened position with respect to said closure housing when said second latch means of said latching member is disengaged from said first latch means of said latch track member.

18. A latch mechanism as set forth in claim 17, wherein:

said second latch means comprises a body portion slidably mounted upon said latching member, and a latching element, integral with said body portion so as to define therewith a one-piece latching component, operatively engageable with said first latch means of said latch track member.

19. A latch mechanism as set forth in claim 18, wherein:

relative movement between said closure member and said closure housing occurs in one of two opposite longitudinal directions; and said second latch means is disposed upon said latching member so as to be slidable in a direction transverse to said opposite longitudinal directions.

20. A latch mechanism as set forth in claim 17, wherein:

said means integrally formed upon said latching member for releasably mounting said latching member upon said one of said two structures comprising said closure member and said closure housing comprises bracket means provided upon one side of said latching member for engaging an edge portion of an aperture defined within said one of said two structures comprising said closure member and said closure housing, and snap-fitting means provided upon an opposite side of said latching member for snap-fittingly engaging an opposite edge portion of said aperture defined within said one of said two structures comprising said closure member and said closure housing; and said means integrally formed upon said latch track member for releasably mounting said latch track member upon said other one of said two structures comprising said closure member and said closure housing comprises bracket means provided upon one side of said latch track member for engaging an edge portion of an aperture defined within said other one of said two structures comprising said closure member and said closure housing, and snap-fitting means provided upon an opposite side of said latch track member for snap-fittingly engaging an opposite edge portion of said aperture defined within said other one of said two structures comprising said closure member and said closure housing.

\* \* \* \* \*